United States Patent [19]
Fujisawa et al.

[11] Patent Number: 5,092,930
[45] Date of Patent: Mar. 3, 1992

[54] METHOD FOR MAKING INSOLUBLE HEAVY METALS CONTAINED IN FLY ASH DISCHARGED FROM INCINERATOR

[75] Inventors: Yoshinari Fujisawa; Yoji Ohgaki; Yuji Yoshii; Tsuneharu Miyachi, all of Tokyo, Japan

[73] Assignee: NKK Corporation, Tokyo, Japan

[21] Appl. No.: 432,721

[22] PCT Filed: Feb. 27, 1989

[86] PCT No.: PCT/JP89/00196

§ 371 Date: Oct. 23, 1989

§ 102(e) Date: Oct. 23, 1989

[87] PCT Pub. No.: WO89/07990

PCT Pub. Date: Sep. 8, 1989

[30] Foreign Application Priority Data

Feb. 29, 1988 [JP] Japan .................................. 63-46986

[51] Int. Cl.$^5$ ............................................. C04B 18/08
[52] U.S. Cl. ................................... 106/708; 210/728
[58] Field of Search ............................ 210/728; 106/708

[56] References Cited

U.S. PATENT DOCUMENTS 4,053,401 10/1977 Fukushima et al. .................. 210/52
4,442,215 4/1984 Vognsen et al. ..................... 435/262

FOREIGN PATENT DOCUMENTS 59-21675  5/1984  Japan .
63-205192  8/1988  Japan .
63-278589  11/1988  Japan .

Primary Examiner—William R. Dixon, Jr.
Assistant Examiner—Alan Wright
Attorney, Agent, or Firm—Frishauf, Holtz, Goodman & Woodward

[57] ABSTRACT

A method for making insoluble detrimental heavy metals contained in a fly ash collected from an exhaust gas discharged from an incinerator. For the purpose of making insoluble the heavy metals, a chelating agent and water are added to the fly ash and these substances are kneaded to form a kneaded mass. The kneaded mass has a strong alkalinity under the effect of an alkaline substance added to the exhaust gas to remove hydrogen chloride and other detrimental components contained in the exhaust gas. The reactions between the heavy metals and the chelating agent in the kneaded mass are promoted by adjusting the amount of added water to limit a pH value of the kneaded mass to up to 12, thereby converting the heavy metals into water-insoluble chelate compounds through the reaction with the chelating agent.

14 Claims, 3 Drawing Sheets

METHOD FOR MAKING INSOLUBLE HEAVY METALS CONTAINED IN FLY ASH DISCHARGED FROM INCINERATOR

FIELD OF THE INVENTION

The present invention relates to a method for making insoluble detrimental heavy metals contained in a fly ash collected from an exhaust gas discharged from an incinerator.

BACKGROUND OF THE INVENTION

An exhaust gas produced by incineration of wastes in an incinerator contains detrimental components such as hydrogen chloride and sulfur oxide. In addition, a fly ash collected from the exhaust gas contains detrimental heavy metals such as zinc, lead and cadmium. It is the conventional practice therefore to add an alkaline substance such as slaked lime, sodium carbonate or calcium carbonate to the above-mentioned exhaust gas discharged from the incinerator while the exhaust gas passes through a flue of the incinerator to remove such detrimental components as hydrogen chloride and sulfur oxide contained in the exhaust gas, then collect a fly ash mixed in the exhaust gas by means of a dust collector, and release the exhaust gas through a chimney to the open air.

The fly ash collected from the exhaust gas as described above has a strong alkalinity under the effect of the alkaline substance added to remove the detrimental components such as hydrogen chloride and sulfur oxide contained in the exhaust gas. For such a fly ash, which is usually dumped to a land site for reclamation, it is necessary prior to dumping to apply a treatment to make insoluble detrimental heavy metals contained in the fly ash.

For the purpose of making insoluble detrimental heavy metals contained in the fly ash, the following methods are known:

(1) A method comprising adding cement and water to the fly ash and kneading the mixture into a lump;

(2) A method comprising adding molten asphalt to the fly ash and kneading the mixture into a lump;

(3) A method comprising placing the fly ash in a tank containing water, neutralizing the mixture by means of an exhaust gas from an incinerator blown into the tank to convert heavy metals in the fly ash into insoluble compounds, then removing water, and forming the insoluble compounds into a lump;

(4) A method comprising adding an acid and a sulfide to the fly ash to convert heavy metals in the fly ash into insoluble compounds, then removing water, and forming the insoluble compounds into a lump; and (5) A method comprising washing the fly ash by means of water having a weak alkalinity as represented by a pH of about 10, to convert heavy metals in the fly ash into insoluble compounds, then removing water, and forming the insoluble compounds into a lump.

The method (1) above of forming the fly ash into a lump by means of cement and the method (2) above of forming the fly ash into a lump by means of molten asphalt have the following problem: after dumping, heavy metals such as lead, which are easily soluble into a liquid having a high pH value, may be dissolved from the lumpy fly ash.

The method (3) above of treating heavy metals contained in the fly ash through neutralization has the following problem: the steps for neutralizing, dewatering and treating waste water produced in dewatering require complicated facilities, thus leading to a high cost.

The method (4) above of treating heavy metals contained in the fly ash by means of an acid has the following problem: the steps for acid treatment, dewatering and treating waste water produced in dewatering require complicated facilities, consuming much acid, thus resulting in a high cost.

The method (5) above of washing the fly ash by means of weak-alkaline water has the following problem: washing requires water in a large quantity, and the reaction for converting heavy metals contained in the fly ash into hydroxides or carbonates requires a long period of time, leading to huge-scale facilities.

Under such circumstances, there is a strong demand for the development of a method for making insoluble heavy metals contained in a strong-alkaline fly ash, as collected from an exhaust gas discharged from an incinerator, easily and economically and stably for a long period of time, but such a method has not as yet been proposed.

SUMMARY OF THE INVENTION

An object of the present invention is therefore to provide a method for making insoluble heavy metals contained in a strong-alkaline fly ash, as collected from an exhaust gas discharged from an incinerator, easily and economically and stably for a long period of time.

In accordance with one of the features of the present invention, there is provided a method for making insoluble heavy metals contained in a fly ash discharged from an incinerator, characterized by comprising the steps of:

adding a chelating agent and water to a fly ash containing detrimental heavy metals, as collected from an exhaust gas discharged from an incinerator, and kneading these substances to form a kneaded mass, said kneaded mass having a strong alkalinity resulting from the presence of an alkaline substance added to remove hydrogen chloride and sulfur oxide contained in said exhaust gas;

adjusting the amount of said added water to limit a pH value of said kneaded mass to up to 12, thereby promoting the reaction between said heavy metals and said chelating agent;

thereby converting said heavy metals into water-insoluble chelate compounds through the reaction with said chelating agent.

DETAILED DESCRIPTION OF PREFERRED EMBODIMENTS

From the above-mentioned point of view, extensive studies were carried out to develop a method for making insoluble heavy metals contained in a strong-alkaline ash, as collected from an exhaust gas discharged from an incinerator, easily and economically and stably for a long period of time. As a result, the following findings were obtained:

(1) The chemical composition was investigated for a fly ash collected from an exhaust gas, to which an alkaline substance was added to remove detrimental components such as hydrogen chloride and sulfur oxide. A typical example of the chemical composition of the fly ash is sown in Table 1.

TABLE 1

| (wt. %) | | | | | | | | |
|---|---|---|---|---|---|---|---|---|
| $SiO_2$ | CaO | $Fe_2O_3$ | $Al_2O_3$ | $SO_3$ | MgO | Na | K | Cl |
| 8–15 | 25–50 | 1–3 | 7–16 | 2–7 | 1–6 | 2–5 | 2–5 | 10–25 |

| (mg/Kg) | | | | |
|---|---|---|---|---|
| Zn | Cd | Pb | Total Cr | Total Hg |
| 1000–10000 | 60–500 | 500–3000 | 50–600 | 2–20 |

The fly ash having the above-mentioned chemical composition was added to water in a prescribed amount at a weight-volume % of 10%, and the mixture was vibrated for six hours and filtered to obtain a test dissolution liquid. The value of pH of the resultant test dissolution liquid of the fly ash was investigated. The test liquid showed a pH value of from 12.3 to 13.3, proving that the test liquid had a strong alkalinity. Furthermore, lead contained in the fly ash was dissolved into the test liquid in an amount of over 3 mg/l, which is the allowable standard dissolution value for industrial wastes in Japan (hereinafter referred to as the "standard dissolution value"). Much lead was dissolved from the fly ash because lead tends to be more easily dissolved in a liquid having a higher pH value.

(2) By adding a chelating agent and water to a fly ash containing heavy metals and kneading the mixture, it is possible to convert the heavy metals into water-insoluble chelate compounds through the reaction with the chelating agent.

(3) It is commonly known that the chelating reaction converting the heavy metals into the chelate compounds takes place most efficiently within the range of pH value of from 3 to 10. The chelating reaction efficiency was therefore investigated by adding the chelating agent to a test liquid into which heavy metals had been dissolved from a fly ash, while changing the pH value of the test liquid. The result permitted confirmation that a pH value of the test liquid of over about 10 led to a decrease in the chelating reaction efficiency.

(4) A kneaded mass formed by adding a chelating agent and water to a fly ash containing heavy metals and kneading the mixture, has a strong alkalinity under the effect of an alkaline substance added to the exhaust gas to remove detrimental components such as hydrogen chloride contained in the exhaust gas.

Figure 1:
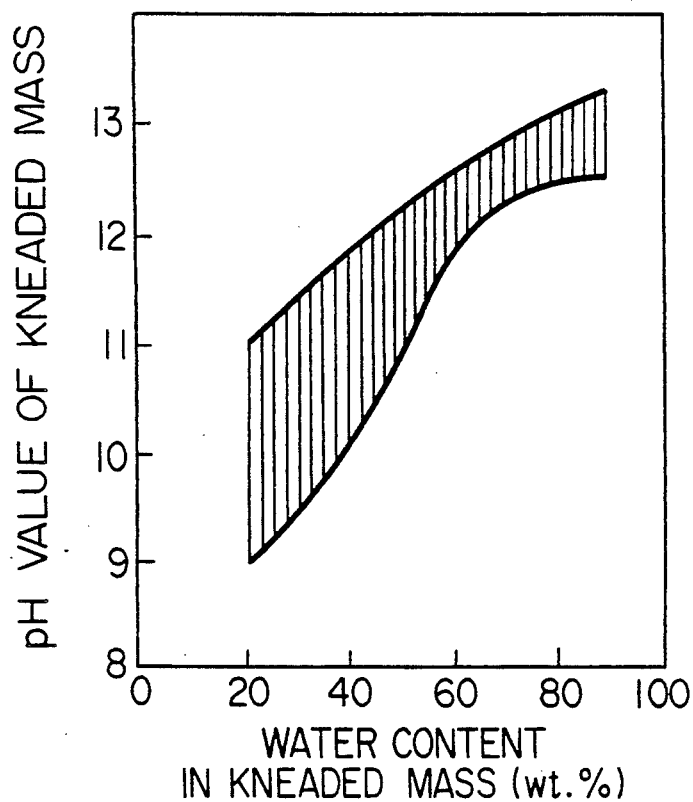
FIG. 1 is a graph illustrating the effect of a water content in a kneaded mass, formed by adding water to a fly ash and kneading the mixture, on a pH value of the kneaded mass.

For a kneaded mass formed by adding water to a fly ash containing heavy metals and kneading the mixture, the effect of a water content in the kneaded mass on a pH value thereof was investigated. More particularly, water was added to a plurality of kinds of fly ash having the chemical composition as shown in Table 1, while changing the amount of added water, and the mixtures were kneaded to form kneaded masses. The pH value was investigated for these kneaded masses. FIG. 1 is a graph illustrating the effect of a water content in the kneaded mass on a pH value thereof. As is clear from FIG. 1, the pH value of the kneaded mass decreases according as the water content in the kneaded mass decreases. As a result, it was suggested that, when adding a chelating agent and water to the fly ash and kneading the mixture to form a kneaded mass, it was possible to obtain a pH value suitable for the chelating reaction by adjusting the amount of added water, and the range of pH value suitable for the chelating reaction capable of making heavy metals water-insoluble, was up to 12.

The above-mentioned decrease in pH value is due to the concentration of calcium chloride dihydrate ($CaCl_2 \cdot 2H_2O$)), sodium chloride (NaCl), potassium chloride (KCl) and calcium hydroxide ($Ca(OH)_2$), which are main soluble salt components in the fly ash. Up to a temperature of the kneaded mass of about 80° C., almost no effect is exerted by temperature on the pH value.

(5) According to these findings, it is possible to convert heavy metals contained in the fly ash into water-insoluble chelate compounds through the reactions with a chelating agent, by adding the chelating agent and water to the fly ash collected from an exhaust gas, to which an alkaline substance has been added to remove detrimental components such as hydrogen chloride, kneading the mixture to form a kneaded mass, adjusting the amount of added water to limit a water content in the kneaded mass to up to 60 wt. %, and thereby limiting a pH value of the kneaded mass to up to 12.

The present invention was developed on the basis of the above-mentioned findings. The method of the present invention for making insoluble heavy metals contained in a fly ash discharged from an incinerator is described below.

The chelating agent used in the present invention is as follows:

(1) A water-soluble low-molecular compound or a water-soluble high-molecular compound, which has at least one chelate-forming radical and converts the heavy metals contained in a fly ash into the water-insoluble chelate compounds through the reactions with the above-mentioned heavy metals.

As the above-mentioned chelating agent, a low-molecular compound or a high-molecular compound, which contains, for example, at least one of dithiocarbamate radical, thiol radical, xanthate radical and thioureide radical, is used.

(2) A water-insoluble low-molecular compound or a water-insoluble high-molecular compound, which has at least one chelate-forming radical and converts the heavy metals contained in a fly ash into the water-insoluble chelate compounds through the reactions with the above-mentioned heavy metals.

As the above-mentioned chelating agent, a low-molecular compound or a high-molecular compound, which contains, for example, at least one of amino acid radical (such as glycine radical and iminodiacetate radical) polyamino radical and phosphomethylamino radical, is used.

In the present invention, a kneaded mass is formed by adding the above-mentioned chelating agent and water to a fly ash containing heavy metals, as collected from an exhaust gas, to which an alkaline substance has been added to remove detrimental components such as hydrogen chloride, and kneading the mixture. In this kneading, it is necessary to adjust the amount of added water to limit a water content in the kneaded mass to up to 60 wt. %, and thereby limiting a pH value of the kneaded mass to up to 12.

Figure 2:
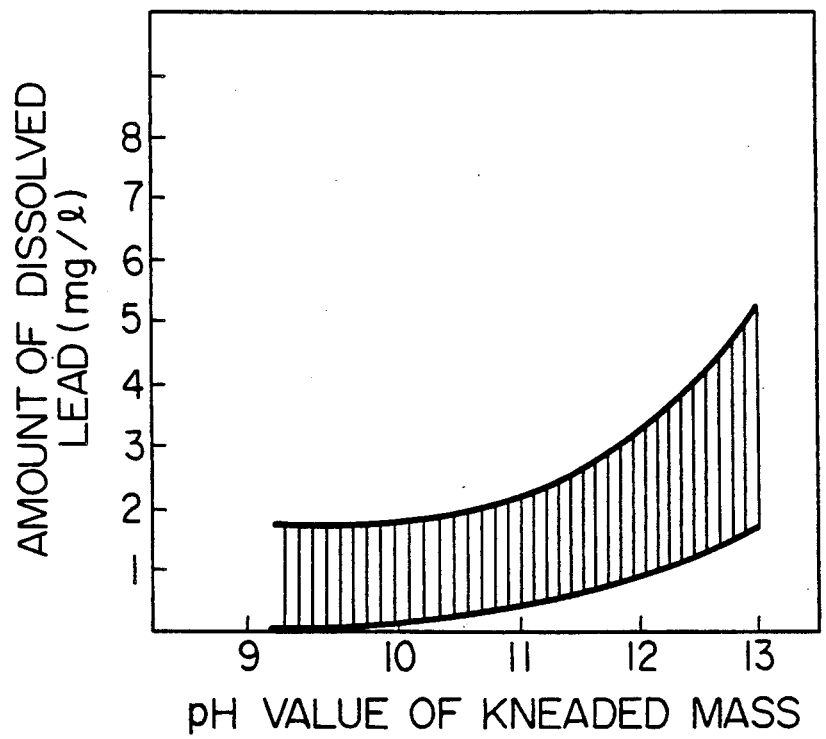
FIG. 2 is a graph illustrating the effect of a pH value of a kneaded mass, formed by adding a chelating agent and water to a fly ash and kneading the mixture, on an amount of dissolved lead from the kneaded mass.

FIG. 2 is a graph illustrating the effect of a pH value of a kneaded mass, formed by adding a chelating agent and water to a fly ash as described below, and kneading the mixture, on an amount of dissolved lead from the kneaded mass. More particularly, a plurality of kinds of fly ash having a strong alkalinity were sampled from three different incinerators. Sodium diethyldithiocarbamate, a strong chelating agent, in an amount of one equivalent relative to the amount of heavy metals contained in the fly ash and water were added to each of these kinds of fly ash. A plurality of kind of kneaded mass having different pH values were formed by adjusting the amount of added water. The thus formed kneaded masses were exposed outdoors at the ambient temperature for five days. Then, the kneaded masses were placed in water to investigate the amount of dissolved lead from the kneaded masses.

As a result, as is clear from FIG. 2, it is possible to inhibit the amount of dissolved lead from the kneaded mass to up to 3 mg/l, which is the standard dissolution value, by limiting a pH value of the kneaded mass to up to 12 through adjustment of the amount of added water. With a pH value of the kneaded mass of over 12, on the other hand, the amount of dissolved lead from the kneaded mass sharply increases.

Figure 3:
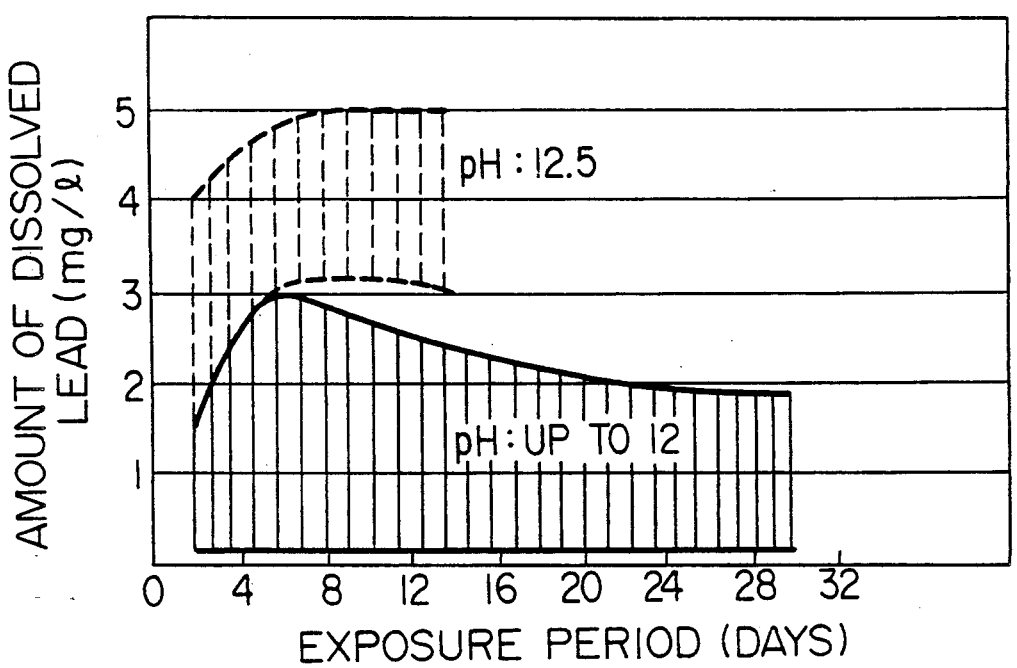
FIG. 3 is a graph illustrating an amount of dissolved lead from a kneaded mass having a pH value of up to 12 within the scope of the present invention, and an amount of dissolved lead from a kneaded mass having a pH value of 12.5 outside the scope of the present invention, by the days of exposure.

FIG. 3 is a graph illustrating an amount of dissolved lead from a kneaded mass having a pH value of up to 12 within the scope of the present invention, and an amount of dissolved lead from a kneaded mass having a pH value of 12.5 outside the scope of the present invention, by the days of exposure. In FIG. 3, the solid line represents the kneaded mass having a pH value of up to 12 within the scope of the present invention, and the dotted line represents the kneaded mass having a pH value of 12.5 outside the scope of the present invention. These kneaded masses were placed in water, i.e., a dissolution liquid, having a pH value of from 12.3 to 13.0.

As is clear from FIG. 3, in spite of the high pH value of the dissolution liquid of from 12.3 to 13.0, the amount of dissolved lead from the kneaded mass having a pH value of up to 12 within the scope of the present invention, is up to 3 mg/l, which is the standard dissolution value, even after exposure for a long period of time. For the kneaded mass having a pH value of 12.5 outside the scope of the present invention, in contrast, the amount of dissolved lead increases to over 3 mg/l if the period of exposure is longer than about five days.

Even when the above-mentioned sodium diethyldithiocarbamate is replaced, as the chelating agent to be added to the fly ash, by any one of chelate resin having an iminodiacetate radical, cysteine, thiourea and amylxanthate, the effect identical with that described above is available by limiting the pH value of the kneaded mass to up to 12.

As is evident from the above description, in order to convert the heavy metals contained in a fly ash as collected from an exhaust gas, to which an alkaline substance has been added to remove detrimental components such as hydrogen chloride, into the water-insoluble chelate compounds through reactions with the chelating agent, it is essential to limit a pH value of the kneaded mass to up to 12.

In order to limit a pH value of the kneaded mass to up to 12, it is necessary to limit the water content in the kneaded mass to up to 60 wt. % through adjustment of the amount of added water when forming the kneaded mass, as described above. To keep a low water content in the kneaded mass is advantageous also in handling and transportation of the kneaded mass.

Use of a plurality of kinds of chelating agent so as to be adapted to individual ones of a plurality of kinds of heavy metal contained in the fly ash, can promote formation of the chelate compounds and permits reduction of the amount of added chelating agents. The amounts of dissolved heavy metals were investigated, for each of a kneaded mass formed by adding two kinds of chelating agent, i.e., sodium diethyldithiocarbamate and chelate resin having a phosphomethylamino radical each in an amount of 0.5 equivalents relative to the amount of respective heavy metals contained in the fly ash, a kneaded mass formed by adding a single kind of chelating agent, i.e., sodium diethyldithiocarbamate in an amount of one equivalent relative to the amount of heavy metals contained in the fly ash, and a kneaded mass formed without adding any chelating agent. The results are shown in Table 2.

TABLE 2

| | (mg/l) | | | | |
|---|---|---|---|---|---|
| | Zn | Pb | Cr | Cd | Hg |
| Kneaded mass added with two kinds of chelating agent | 0.1 | 0.5 | up to 0.1 | up to 0.01 | up to 0.0005 |
| Kneaded mass added with a single kind of chelating agent | 2.5 | 0.8 | up to 0.1 | 0.05 | up to 0.0008 |
| Kneaded mass added with no chelating agent | 17 | 58 | 0.2 | 0.3 | 0.003 |

As is clear from Table 2, the amount of dissolved heavy metals, particularly zinc, considerably decreased in the case of the kneaded mass added with the two kinds of chelating agent as compared with the kneaded mass added with a single kind of chelating agent.

The above-mentioned decrease in the amount of dissolved heavy metals through addition of a plurality of kinds of chelating agent is attributable to the difference in preference to the reaction with heavy metals between the chelating agents. More specifically, an ordinary waste liquid, except for special ones containing a complexing agent, has relatively low contents of heavy metals, and there are relatively small differences in concentration between a plurality of heavy metals to be subjected to a treatment to make insoluble, except only for mercury. Unlike such an ordinary waste liquid, a fly ash discharged from an incinerator has high contents of heavy metals, with considerable differences in concentration between a plurality of heavy metals to be subjected to a treatment to make insoluble. It is therefore possible to further reduce the amount of dissolved heavy metals by forming a kneaded mass through addition to the fly ash of a plurality of kinds of chelating agent selected so as to be adapted to the respective heavy metals contained in the fly ash.

The amount of the chelating agent added to the fly ash ma usually be up to one equivalent relative to the amount of heavy metals contained in the fly ash, while increasing the amount of the added chelating agent to over one equivalent relative to the amount of heavy metals, permits further reduction of the amount of dissolved heavy metals. The amount of the added chelating agent may therefore be increased as required to over one equivalent relative to the amount of heavy metals. In the case of a high-molecular chelating agent comprising a high-molecular compound having many chelate-forming radicals, however, the amount of the added chelating agent over a certain limit may rather cause the increase in the amount of dissolved heavy metals.

Figure 4:
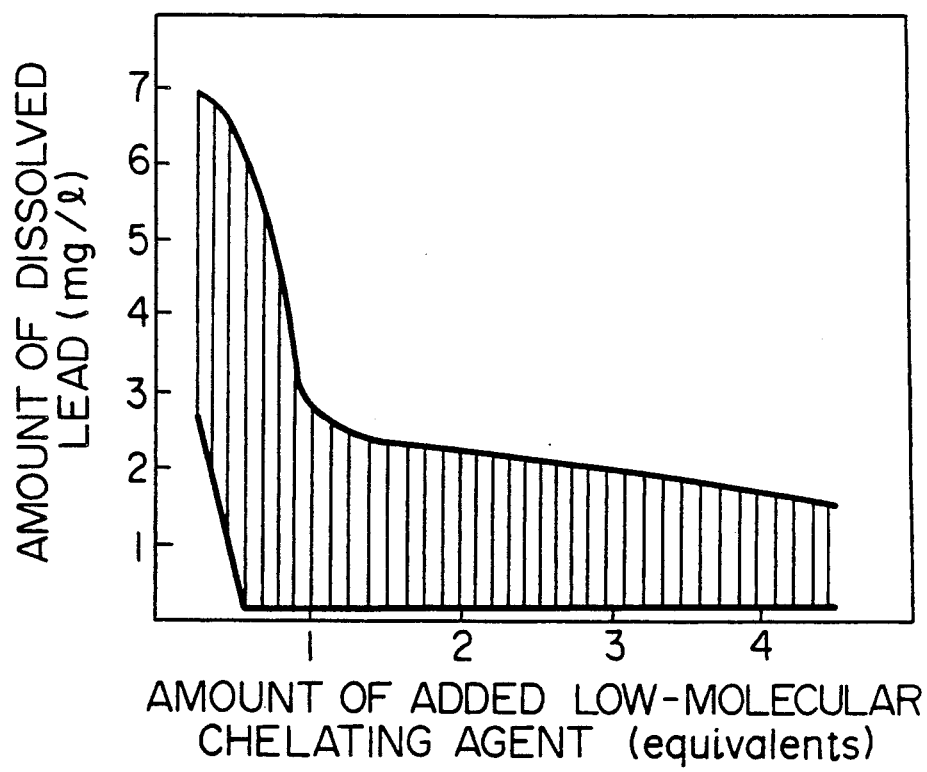
FIG. 4 is a graph illustrating, in a kneaded mass formed in accordance with the method of the present invention, in which a low-molecular chelating agent comprising a low-molecular compound is added to a fly ash, the effect of an amount of the added low-molecular chelating agent on an amount of dissolved lead from the kneaded mass.

FIG. 4 is a graph illustrating, in a kneaded mass formed in accordance with the method of the present invention, in which a low-molecular chelating agent comprising a low-molecular compound is added to a fly ash, the effect of an amount of the added low-molecular chelating agent on an amount of dissolved lead from the kneaded mass. As is clear from FIG. 4, the amount of dissolved lead from the kneaded mass decreases according as the amount of the added chelating agent increases.

Figure 5:
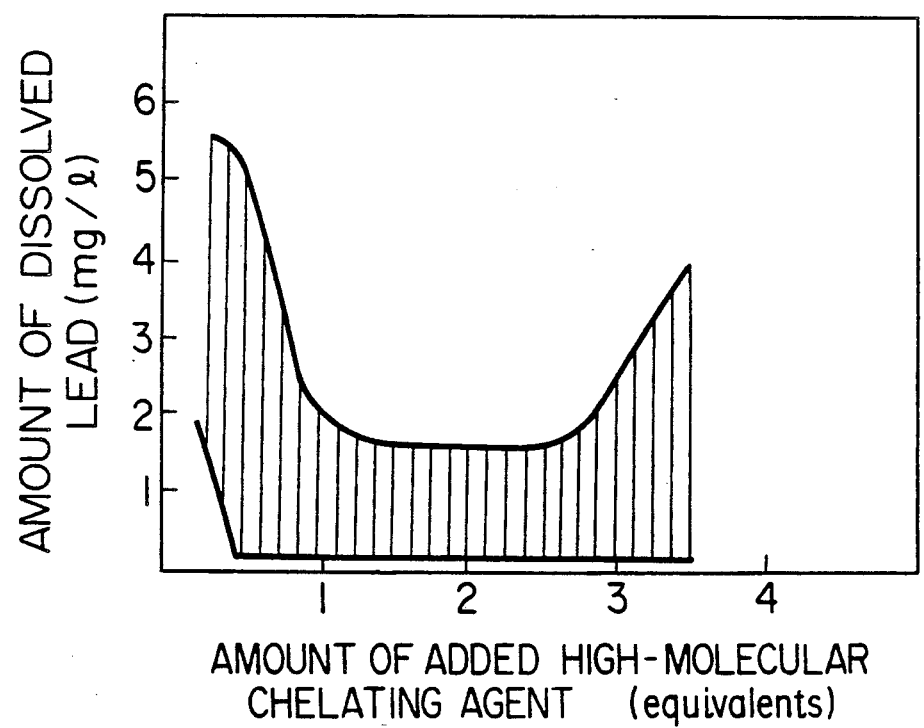
FIG. 5 is a graph illustrating, in a kneaded mass formed in accordance with the method of the present invention, in which a high-molecular chelating agent comprising a high-molecular compound is added to a fly ash, the effect of an amount of the added high-molecular chelating agent on an amount of dissolved lead from the kneaded mass.

FIG. 5 is a graph illustrating, in a kneaded mass formed in accordance with the method of the present invention, in which a high-molecular chelating agent comprising a·high-molecular compound is added to a fly ash, the effect of an amount of the added high-molecular chelating agent on an amount of dissolved lead from the kneaded mass. As is clear from FIG. 5, addition of a high-molecular chelating agent over a certain limit causes on the contrary increase in the amount of dissolved lead from the kneaded mass.

By further additionally adding a high-molecular compound to a fly ash, together with a chelating agent and water, the chelate compounds produced through reaction of the heavy metals with the chelating agent, are coarsened. It is therefore possible to further reduce the amount of dissolved heavy metals and to reduce the amount of the added chelating agent.

More particularly, even when the heavy metals contained in the fly ash are converted into the water-insoluble chelate compounds through the reactions with the chelating agent by adding the chelating agent and water to the fly ash, the particles of the chelate compounds may be dissolved if the particles of the chelate compounds are fine in size. To avoid this, further addition of a high-molecular compound to the fly ash, together with the chelating agent and water, causes the capture of the particles of the chelate compounds into the network of the high-molecular compound, resulting in coarsening of the chelate compounds. It is thus possible to prevent dissolution of the particles of the chelate compounds.

By further additionally adding a high-molecular compound and a bridging agent to a fly ash, together with a chelating agent and water, the network of the high-molecular compound is reinforced with the bridging agent. It is thus possible to further improve the coarsening effect of the chelate compounds brought by the high-molecular compound as described above.

As the above-mentioned high-molecular compound, a water-soluble high-molecular compound or a latex-state high-molecular compound is used, which has the function of coarsening the chelate compounds and the of making the heavy metals in the fly ash water-insoluble or hard-water-soluble through the reactions with components of the fly ash.

Applicable water-soluble high-molecular compounds include, for example, polyvinyl alcohol, sodium alginate, polyacryl or compounds thereof, polyacrylamide or compounds thereof, chitosan or compounds thereof, polyamine or compounds thereof, cellulose or compounds thereof, aluminum polychloride and water glass.

Applicable latex-state high-molecular compounds include, for example, latex polymers of polyacryl or compounds thereof, polyacrylamide or compounds thereof, polyamine or compounds thereof, and styrene-butadiene or compounds thereof.

When using polyvinyl alcohol as the high-molecular compound, for example, glyoxal is used as the bridging agent.

By adding to the fly ash a chelating agent comprising a high-molecular compound having an average molecular weight of at least 10,000, in which a dithiocarbamate radical is combined with polyethylene or the like, in place of adding to the fly ash a chelating agent and a high-molecular compound, it is possible to cause the chelating reaction and the coarsening of the chelate compounds to take place simultaneously.

When adding the chelating agent and water, or the chelating agent, the high-molecular compound and water, to the fly ash and kneading the mixture to form a kneaded mass, the kneading time may be within the range of from about 3 to about 20 minutes if the chelating agent and the high-molecular compound are in a liquid state. When the chelating agent is in a powder form, the steps comprise adding the powdery chelating agent to the fly ash, mixing same, then adding water to the resultant mixture, and kneading the mixture. The mixing and kneading time in this case may be within the range of from about 5 to about 50 minutes in total. When simultaneously adding a powdery chelating agent and water to the fly ash and kneading the mixture, it is necessary to adopt a kneading time slightly longer than that described above. The high-molecular compound to be added together with the powdery chelating agent should preferably be in a liquid state. Upon kneading, hydration heat may cause the increase in temperature of the kneaded mass to about 80° C., but this does not affect the chelating reaction and the effect of making insoluble the resultant kneaded mass.

By adding the chelating agent and the high-molecular compound to the fly ash, or adding the chelating agent comprising a high-molecular compound to the fly ash, as described above, it is possible to coarsen the chelate compounds. Furthermore, the high-molecular compound or the chelating agent comprising a high-molecular compound makes it easier for the kneaded mass to solidify, thus permitting prevention of outflow or splash of the kneaded mass after dumping thereof.

Dumping the kneaded mass in the form of a lump prepared through addition of cement to the kneaded mass formed in accordance with the method of the present invention, is more effective.

Now, the method of the present invention is described more in detail by means of an example in comparison with an example for comparison.

EXAMPLE

A kneaded mass having a pH value of 10.2 (hereinafter referred to as the "sample of the invention") was prepared by adding a solution of a high-molecular chelating agent, in which a dithiocarbamate radical was combined with polyethylene, in an amount of 0.8 equivalents relative to the amount of heavy metals contained in a fly ash, and water in an amount of 250 ml, to 1 kg of the fly ash having the chemical composition shown in Table 3, as collected from an exhaust gas, to which an alkaline substance had been added to remove detrimental components such as hydrogen chloride, and kneading the mixture for five minutes by means of a mixer.

TABLE 3

| (wt. %) | | | | | | | | |
|---|---|---|---|---|---|---|---|---|
| $SiO_2$ | CaO | $Fe_2O_3$ | $Al_2O_3$ | $SO_3$ | MgO | Na | K | Cl |
| 14 | 37 | 2 | 13 | 4 | 3 | 4 | 4 | 18 |

| (mg/kg) | | | | |
|---|---|---|---|---|
| Zn | Cd | Pb | Total Cr | Total Hg |
| 6170 | 270 | 1830 | 170 | 3.1 |

For comparison purposes, a kneaded mass for comparison having a pH value of 10.2 (hereinafter referred to as the "sample for comparison") was prepared by adding only water in an amount of 250 ml to 1 kg of the above-mentioned fly ash, and kneading the mixture for five minutes by means of a mixer.

The samples of the invention and the samples for comparison prepared as described above were exposed outdoors for certain periods of time. The exposure periods were for one day, 10 days, 20 days, and 30 days. Each of the samples of the invention and the samples for comparison exposed for different periods was placed in water, and the amounts of dissolved heavy metals from each of these samples were investigated. The results are shown in Table 4.

TABLE 4

| | Sample of the invention Exposure period (days) | | | | Sample for comparison Exposure period (days) | | | |
|---|---|---|---|---|---|---|---|---|
| | 1 | 10 | 20 | 30 | 1 | 10 | 20 | 30 |
| Zn (mg/l) | 1.75 | 0.72 | 0.47 | 0.40 | 13.5 | 11.1 | 10.6 | 8.7 |
| Cd (mg/l) | up to 0.01 | up to 0.01 | up to 0.01 | up to 0.01 | 0.3 | 0.3 | 0.2 | 0.2 |
| Pb (mg/l) | 0.15 | 0.12 | 0.10 | 0.05 | 53.1 | 46.5 | 38.1 | 30.3 |
| Total Cr (mg/l) | up to 0.1 | up to 0.1 | up to 0.1 | up to 0.1 | 0.3 | 0.2 | up to 0.1 | up to 0.1 |
| Total Hg (mg/l) | up to 0.0005 | up to 0.0005 | up to 0.0005 | up to 0.0005 | up to 0.0008 | 0.0009 | up to 0.0005 | up to 0.0005 |

As is evident from Table 4, the amounts of dissolved heavy metals, particularly of zinc, cadmium and lead, from the samples of the invention were remarkably smaller than those from the samples for comparison for any of the periods of exposure.

According to the method of the present invention, as described above in detail, it is possible to easily and economically and stably for a long period of time make insoluble the heavy metals contained in a fly ash having a strong alkalinity, as collected from an exhaust gas discharged from an incinerator, thus providing industrially useful effects.

What is claimed is:

1. A method for insolubilizing at least one heavy metal contained in a fly ash collected from an exhaust gas discharged from an incinerator, said fly ash containing at least one alkaline substance selected from the group consisting of lime, sodium carbonate and calcium carbonate, which is added to remove hydrogen chloride and sulfur oxide contained in said exhaust gas, which comprises the steps of:

adding at least one chelating agent, in an amount of from 0.25 to 3.2 equivalents relative to the amount of said at least one heavy metal, and water to said fly ash and kneading these substances to form a kneaded mass, said kneaded mass having a pH value up to 12 by maintaining a content of said water to up to 60 wt. %, thereby promoting the reaction between said at least one heavy metal and said at least one chelating agent in said kneaded mass.

2. The method as claimed in claim 1, wherein:

said at least one chelating agent comprises at least one low molecular weight compound comprising at least one radical selected from the group consisting of a dithiocarbamate radical, a thiol radical, a xanthate radical and a thioureide radical;

and a high molecular weight compound comprising at least one radical selected from the group consisting of a dithiocarbamate radical, a thiol radical, a xanthate radical and a thioureide radical.

3. The method as claimed in claim 1, wherein:

said at least one chelating agent comprises at least one low molecular weight compound comprising at least one radical selected from the group consisting of an amino acid, radical, a polyamino radical, and a phosphomethylamino radical;

and a high molecular weight compound comprising at least one radical selected from the group consisting of an amino acid racial, a polyamino radical, and a phosphomethylamino radical.

4. The method as claimed in claim 1, 2 or 3, wherein:

at least one chelating agent which reacts with an individual one of said at least one heavy metal contained in said fly ash forms said at least one water-insoluble chelate compound.

5. The method as claimed in claim 1, 2, or 3 wherein:

at least one coagulant selected from the group consisting of polyvinyl alcohol, sodium alginate, polyacrylamide and compounds thereof, chitosan and compounds thereof, polyamine and compounds thereof, cellulose and compounds thereof, aluminum polychloride, water glass and styrene-butadiene and compounds thereof is added to said fly ash, together with said at least one chelating agent and said water, thereby capturing particles of said at least one chelate compound into a network of said at least one coagulant.

6. The method as claimed in claim 4, wherein:

at least one coagulant selected from the group consisting of polyvinyl alcohol, sodium alginate, polyacrylamide and compounds thereof, chitosan and compounds thereof, polyamine and compounds thereof, cellulose and compounds thereof, aluminum polychloride, water glass and styrene-butadiene and compounds thereof is additionally added to said fly ash, together with said at least one chelating agent and said water, thereby capturing particles of said at least one chelate compound into a network of said at least one coagulant.

7. The method as claimed in claim 1, 2, or 3 wherein:
a coagulant comprising polyvinyl alcohol and a bridging agent comprising glyoxal are additionally added to said fly ash, together with said at least one chelating agent and said water, thereby capturing particles of said at least one chelate compound into a network of said coagulant.

8. The method as claimed in claim 4, wherein:
a coagulant comprising polyvinyl alcohol and a bridging agent comprising glyoxal are additionally added to said fly ash, together with said at least one chelating agent and said water, thereby capturing particles of said at least one chelate compound into said network of said coagulant.

9. The method as claimed in claim 8 wherein the at least one heavy metal is selected from the group consisting of zinc, cadmium, lead, chromium and mercury.

10. The method as claimed in claim 3, wherein the amino acid radical is selected from the group consisting of a glycine radical and an iminodiacetate radical.

11. The method as claimed in claim 9, wherein the at least one chelate agent comprises each of 0.5 equivalents relative to the amount of the at least one heavy metal of sodium diethydithiocarbomate and phosphomethylamino resin.

12. The method as claimed in claim 1, wherein the pH is 10.2; the at least one chelating agent is a dithiocarbomate radical in an amount of 0.8 equivalents relative to the amount of the at least one heavy metal; and the amount of water is 250 ml per 1 kg of the fly ash.

13. The method as claimed in claim 1 wherein the lime is slaked lime.

14. The method as claimed in claim 1, wherein the high molecular compound has an average molecular weight of at least 10,000.

* * * * *

UNITED STATES PATENT AND TRADEMARK OFFICE
CERTIFICATE OF CORRECTION

PATENT NO. : 5,092,930

DATED : March 3, 1992

INVENTOR(S) : FUJISAWA et al

It is certified that error appears in the above-identified patent and that said Letters Patent is hereby corrected as shown below:

Column 10, line 9 (Claim 1):

after "ash", insert --, --.

Column 10, line 11 (Claim 1):

after "value", insert -- of --.

Column 10, line 15 (Claim 1):

after "mass", insert --; thereby converting said at least one heavy metal into at least one water-insoluble chelate compound through the reaction with said at least one chelating agent--.

Column 10, line 18 (Claim 2):

before "low", insert -- of a --.

Column 10, line 28 (Claim 3):

before "low", insert -- of a --.

Column 10, line 30 (Claim 3):

after "acid", delete " , ".

Column 10, line 63 (Claim 5):

before "added", insert -- additionally --.

UNITED STATES PATENT AND TRADEMARK OFFICE
CERTIFICATE OF CORRECTION

PATENT NO. : 5,092,930

DATED : March 3, 1992

INVENTOR(S) : FUJISAWA et al

It is certified that error appears in the above-identified patent and that said Letters Patent is hereby corrected as shown below:

Column 12, line 2 (Claim 8):

change "said" (second occurrence) to -- a --.

Column 12, line 10 (Claim 11):

change "chelate" to -- chelating --.

Column 12, line 12 (Claim 11):

change "diethydithiocarbomate" to

-- diethyldithiocarbamate --.

Column 12, line 15 (Claim 12):

change "dithiocarbo-" to -- dithiocarba- --.

Column 12, line 22 (Claim 14):

after "molecular", insert -- weight --.

Signed and Sealed this

Twenty-fourth Day of August, 1993

*Attest:*

BRUCE LEHMAN

*Attesting Officer*     *Commissioner of Patents and Trademarks*